United States Patent
McCann

[19]

[11] Patent Number: 5,872,441
[45] Date of Patent: Feb. 16, 1999

[54] COMMUTATION CIRCUIT FOR SWITCHED-RELUCTANCE MOTOR

[75] Inventor: Roy A. McCann, Kettering, Ohio

[73] Assignee: ITT Manufacturing Enterprises, Inc., Wilmington, Del.

[21] Appl. No.: 841,191

[22] Filed: Apr. 29, 1997

[51] Int. Cl.[6] ................................................... H02P 7/36
[52] U.S. Cl. ........................ 318/701; 318/439; 318/492
[58] Field of Search .................................. 318/701, 254, 318/439, 138, 434, 492; 313/50–71; 361/23, 31

[56] References Cited

U.S. PATENT DOCUMENTS

| | | | |
|---|---|---|---|
| 3,740,629 | 6/1973 | Kohlhagen | 318/138 |
| 4,114,074 | 9/1978 | Stewart et al. | 318/257 |
| 4,420,717 | 12/1983 | Wallace et al. | 318/696 |
| 4,422,021 | 12/1983 | Schwarz | 318/376 |
| 4,577,164 | 3/1986 | Grib | 331/109 |
| 4,973,896 | 11/1990 | Shiga et al. | 322/28 |
| 5,406,184 | 4/1995 | Bahn | 318/701 |
| 5,446,359 | 8/1995 | Horst | 318/701 |
| 5,576,648 | 11/1996 | Rossi et al. | 327/110 |
| 5,703,451 | 12/1997 | Yamamichi | 318/492 |

*Primary Examiner*—Jonathan Wysocki
*Attorney, Agent, or Firm*—J. Gordon Lewis

[57] ABSTRACT

A commutation circuit for a switched reluctance electric motor. Each phase coil in the motor discharges through a resistance. The resistance is progressively increased during discharge, to thereby decrease the overall time required for full discharge. This decrease in discharge time allows each phase coil to pass current for a longer time, thereby increasing torque which the motor produces.

33 Claims, 18 Drawing Sheets

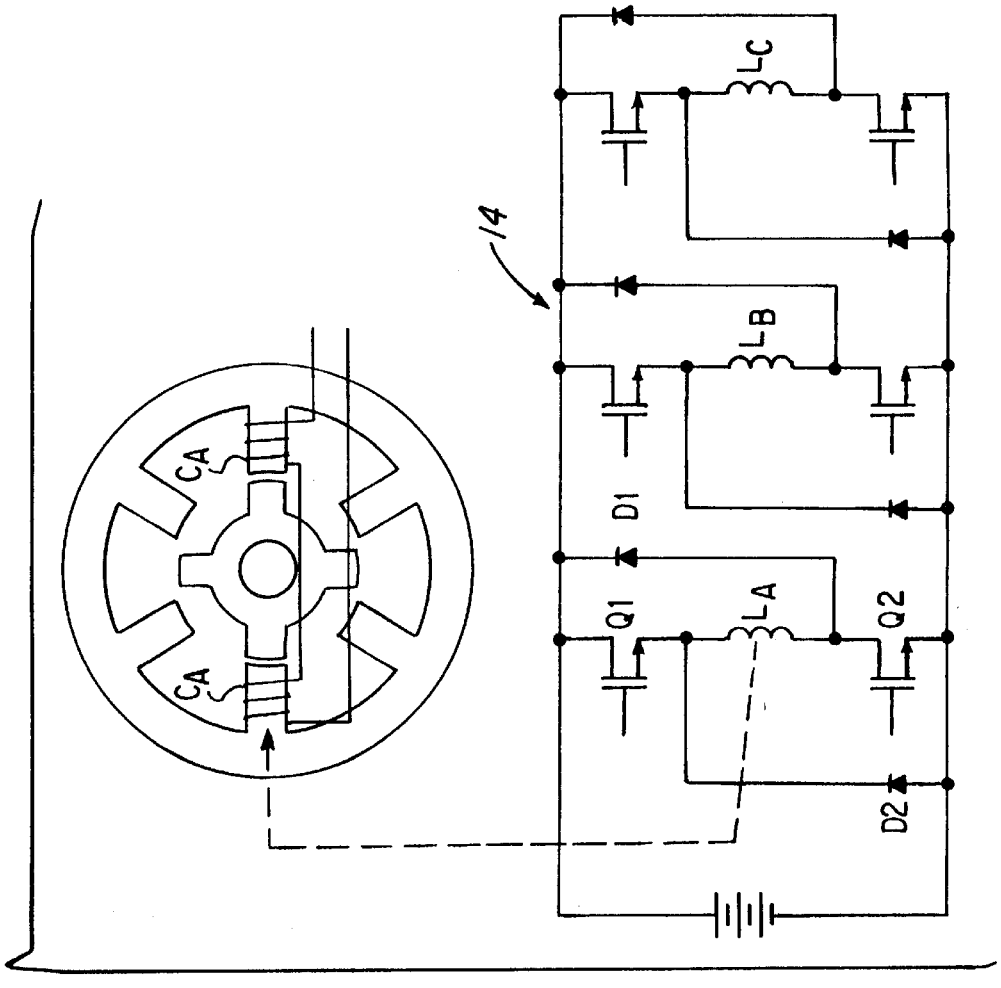
FIG-2
(PRIOR ART)
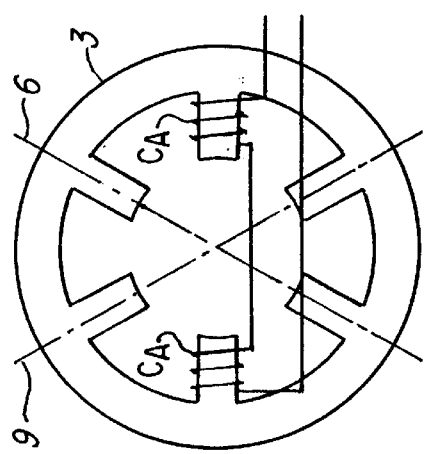
FIG-1
(PRIOR ART)
FIG-1A
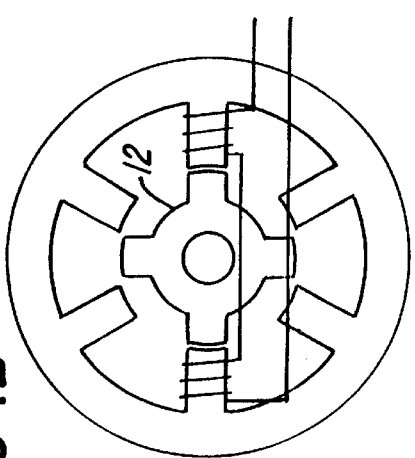
FIG-1B

COMMUTATION CIRCUIT FOR SWITCHED-RELUCTANCE MOTOR

FIELD OF THE INVENTION

The invention concerns a circuit for commutating the current in a switched-reluctance motor. The circuit contains a minimal number of parts, provides increased motor torque, and reduces motor noise.

BACKGROUND OF THE INVENTION

Switched Reluctance Motors (SRMs) are commonly used in automotive applications, such as in window-lift devices, blowers, power seat adjustors, and hydraulic pump motors for anti-lock braking systems. SRMs possess advantages over brush-type motors, in the respects of (1) being more durable and (2) providing torque and speed characteristics which do not significantly change with temperature.

However, SRMs possess three disadvantages. One is that many of them do not deliver the maximum power which is theoretically available. A second is that they require large numbers of power transistors and power diodes, which are expensive. A third is that they produce audible noise. These disadvantages will be examined, with reference to FIGS. 1–5.

FIG. 1A illustrates a stator 3 in an SRM. Coils $C_A$ represent one phase of the motor. Similar coils are installed in the phases represented by dotted lines 6 and 9, but are not shown for ease of illustration. FIG. 1B shows a rotor 12 installed in the SRM.

FIG. 2 illustrates a prior-art switching circuit 14 for controlling current through the phases of the SRM. Inductance $L_A$ represents the coils $C_A$, as indicated. Inductances $L_B$ and $L_C$ represent the inductances of the other phases 6 and 9 in FIG. 1A.

Assume that the SRM is running, and that rotor 12 is rotating counterclockwise, as indicated by the curved arrow in FIG. 3A. As pole P approaches coil $C_A$, current is initiated in that coil preferably when pole P is approximately midway between coil $C_B$ and coil $C_A$, that is, when angle A equals 30 degrees.

This energization is accomplished by turning transistors Q1 and Q2 ON in FIG. 3B, thereby allowing current I to flow through inductance $L_A$, which represents coil $C_A$. The turn-on of transistors Q1 and Q2 is accomplished by a control system known in the art, but not shown. An exemplary control system is the Harris Semiconductor gate-drive controller number D469A.

In order to obtain maximum torque from rotor 12 for the maximum angular rotation, the current in coil $C_A$ should then be terminated when pole P in FIG. 3A becomes perfectly aligned with coil $C_A$, that is, when angle A equals zero. This termination is called "commutation." Termination should not, in theory, occur either before or after the aligned position is reached.

If termination occurs after alignment, the motor will begin acting as a generator, and will apply negative torque to the rotor 12, thereby reducing average power applied to the rotor. (From another point of view, after pole P reaches the aligned position, the still-energized coil $C_A$ tends to "pull" pole P backward.)

If termination occurs prior to the aligned position, maximum torque would not be applied through the entire rotor angle A shown in FIG. 3A, which is required to deliver maximum average power to the rotor 12.

However, it is not possible to apply full current through the full angle A in FIG. 3A, and then terminate the current instantaneously. The primary reason is that the inductance of coil $C_A$ has been steadily increasing since turn-on of transistors Q1 and Q2, because the air-gap between coil $C_A$ and the pole P has been decreasing. The inductance $L_A$ is relatively large when pole P approaches coil $C_A$.

This large inductance prevents instantaneous termination of the current I in FIG. 3B. That is, in general, current in an inductance does not decay instantaneously, but decays exponentially. A large inductance causes the rate of decay to be slow, compared with the rate of decay for a small inductance. (In contrast, when the current was initiated in coil $C_A$, as in FIG. 3B, the inductance of coil $C_A$ was significantly less. The delay imposed in initiating the current was correspondingly shorter, and, for present purposes, is considered negligible.)

Consequently, to allow for the delay required by the exponential decay, transistors Q1 and Q2 in FIG. 4 are turned OFF prematurely, before pole P reaches the aligned position, such as at angle A2. Upon turn-off, the current I decays through the path shown in the circuit, through diodes D1 and D2, and then either (a) returns to the battery B or (b) travels to one of the other inductors L, or a combination of (a) and (b).

The premature turn-off of transistors Q1 and Q2 can reduce power delivered by the motor from the theoretical maximum, as will be shown by computing the angle A2 at which turn-off occurs in the prior art.

In practice, in many automotive SRMs, the discharge time for inductor $L_A$ in FIG. 4 lies in the range of 400 microseconds. A motor running at 3600 rpm requires 1/60 second, or 16,667 micro-seconds, to complete a single revolution. At this speed, 400 micro-seconds represents 2.3 percent of one revolution, or 8.3 degrees.

If angle A in FIG. 3A is 30 degrees, and if termination of the current must occur 8.3 degrees (which is angle A2 in FIG. 4) prior to the aligned position, then full current persists for only 22.7 degrees, compared with the 30 degrees which are theoretically available. Full torque is applied for only 22.7/30, or 75 percent of the rotor's travel.

Thus, the premature termination of the current, which is required by the inductance of coil $C_A$, causes a reduction in output power of the motor.

Regarding the noise mentioned above, the coils $C_A$ in FIG. 4 produce magnetic field lines B. These field lines tend to "squeeze" the iron from which the stator 3 is constructed, and applies a type of hoop stress to the stator 3. However, when the current through the coils $C_A$ abruptly terminates in commutation, the "squeezing" also abruptly terminates, allowing the iron to relax, thereby creating an audible noise pulse.

The sequence of commutation events which occurs in a running motor causes a sequence of these noise pulses.

Therefore, the commutation circuit shown in FIG. 2 fails to deliver maximum power in the motor, and also produces noise. In addition, the circuit requires two transistors, plus two diodes, for each coil, for a total of six transistors and six diodes for the three-phase machine shown in FIG. 4. These components are somewhat expensive, because they must be designed to withstand (a) relatively high currents, and (b) relatively high voltage surges during the commutation cycle.

SUMMARY OF THE INVENTION

It is, therefore, a primary object of the invention to provide a system and method for improving the torque in an SRM.

In one form of the invention, a phase coil of a motor is discharged through a resistance, and the resistance is progressively increased during discharge, to decrease the discharge time.

In one aspect, in a controller for a switched reluctance motor, the improvement comprising a power FET which controls current through a coil of the motor and a system for causing the power FET to operate in its ohmic region during discharge of current through the coil.

In another aspect, a controller for a switched reluctance motor having a coil, comprising a transistor for controlling current through the coil and a system for causing the transistor to carry both charging current, and discharging current, for the coil.

In another aspect, a motor system, comprising a fractional horsepower motor, which includes a pole which rotates past a stator coil and a control system which begins terminating current in the stator coil when the pole is closer than 5.0 degrees of alignment with the stator coil.

In still another aspect, a motor system, comprising a motor coil, through which an increasing current flows, followed by a decreasing current and a circuit system, which causes the increasing current to flow through an FET and causes the decreasing current to flow through said FET.

In yet another aspect, a commutation circuit for a motor having phases, consisting essentially of a first transistor, for each phase, which controls current through the respective phase, a diode, connected to multiple phases, which is back-biased when current initiates in any phase and becomes forward-biased when current decays in any phase, a second transistor, which supplies current to more than one phase.

Other objects and advantages of the invention will be apparent from the following description, the accompanying drawings, and the appended claims.

DETAILED DESCRIPTION OF THE DRAWINGS

FIGS. 1A and 1B illustrate a stator and rotor in a motor;

FIG. 2 illustrates a commutation circuit used to control current through the coils LA;

Figure 3B:
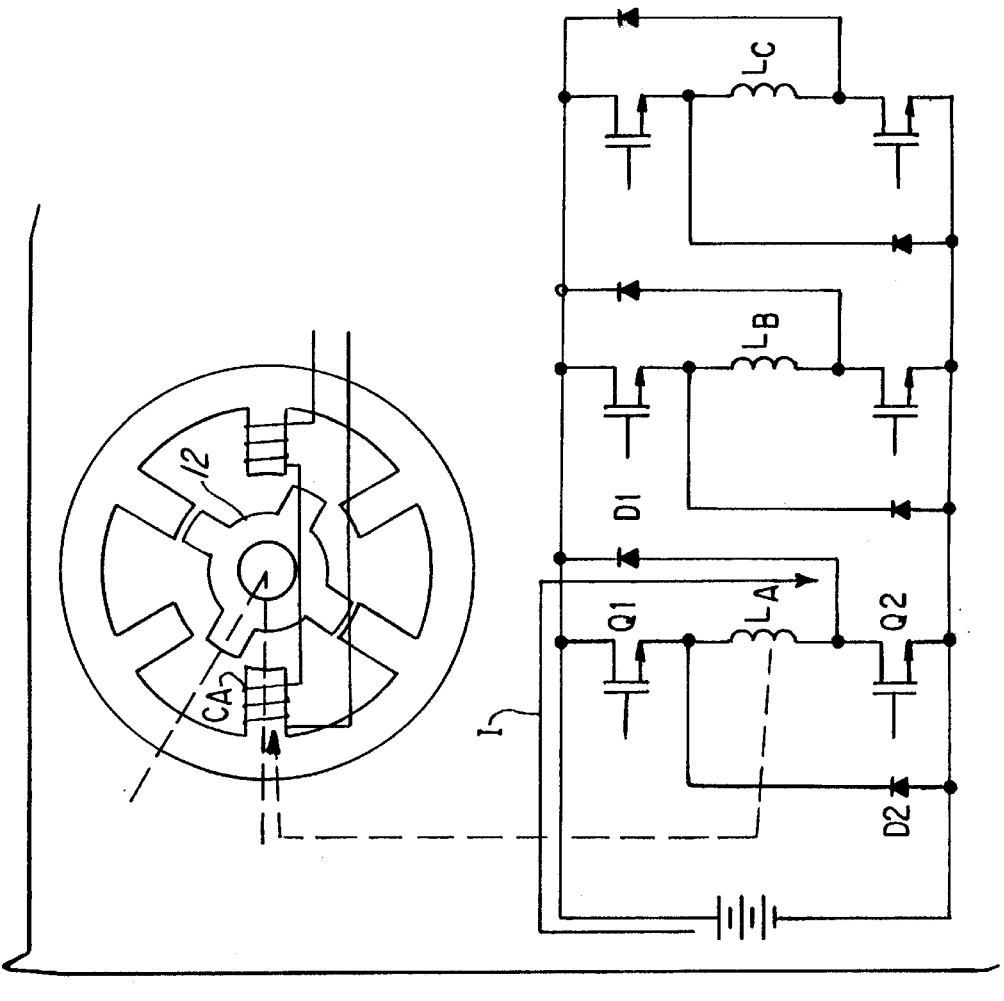
Figure 3A:
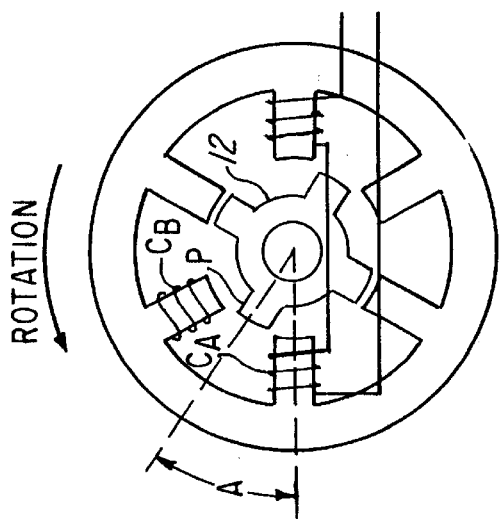
Figure 4:
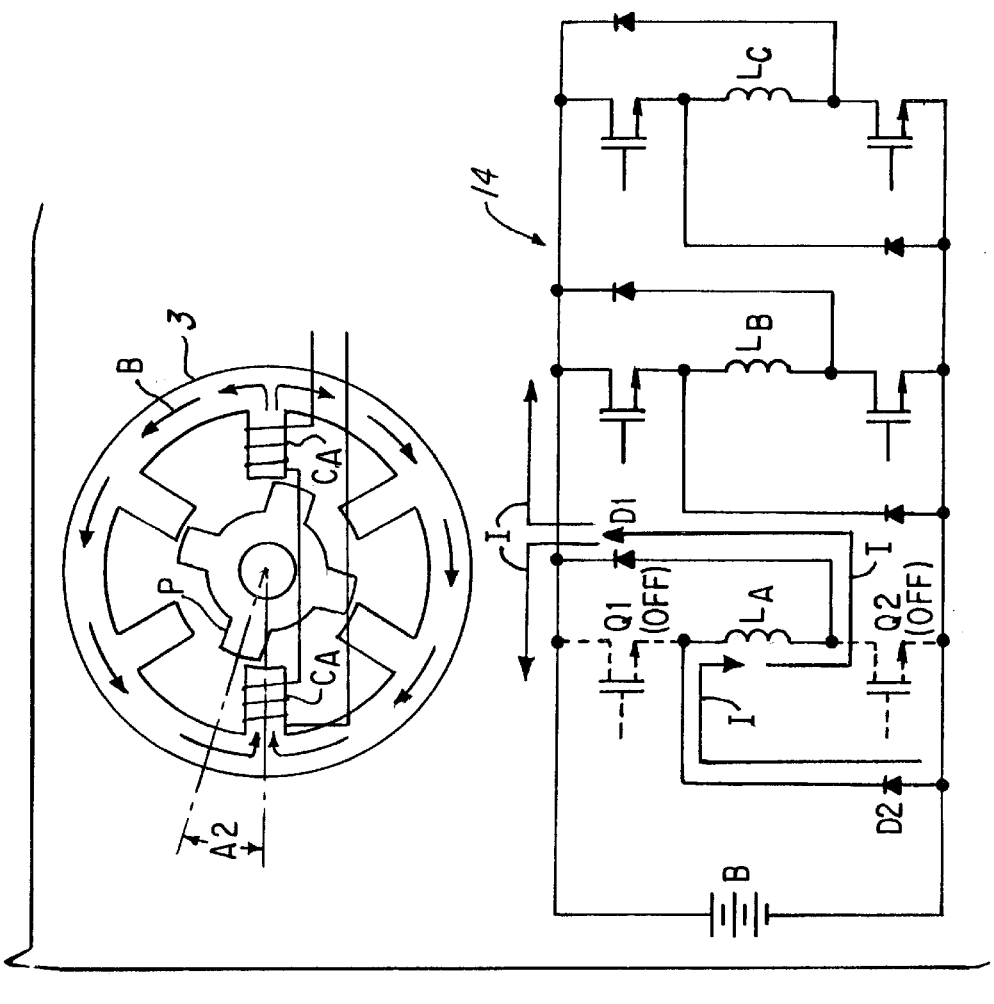
Figure 5:
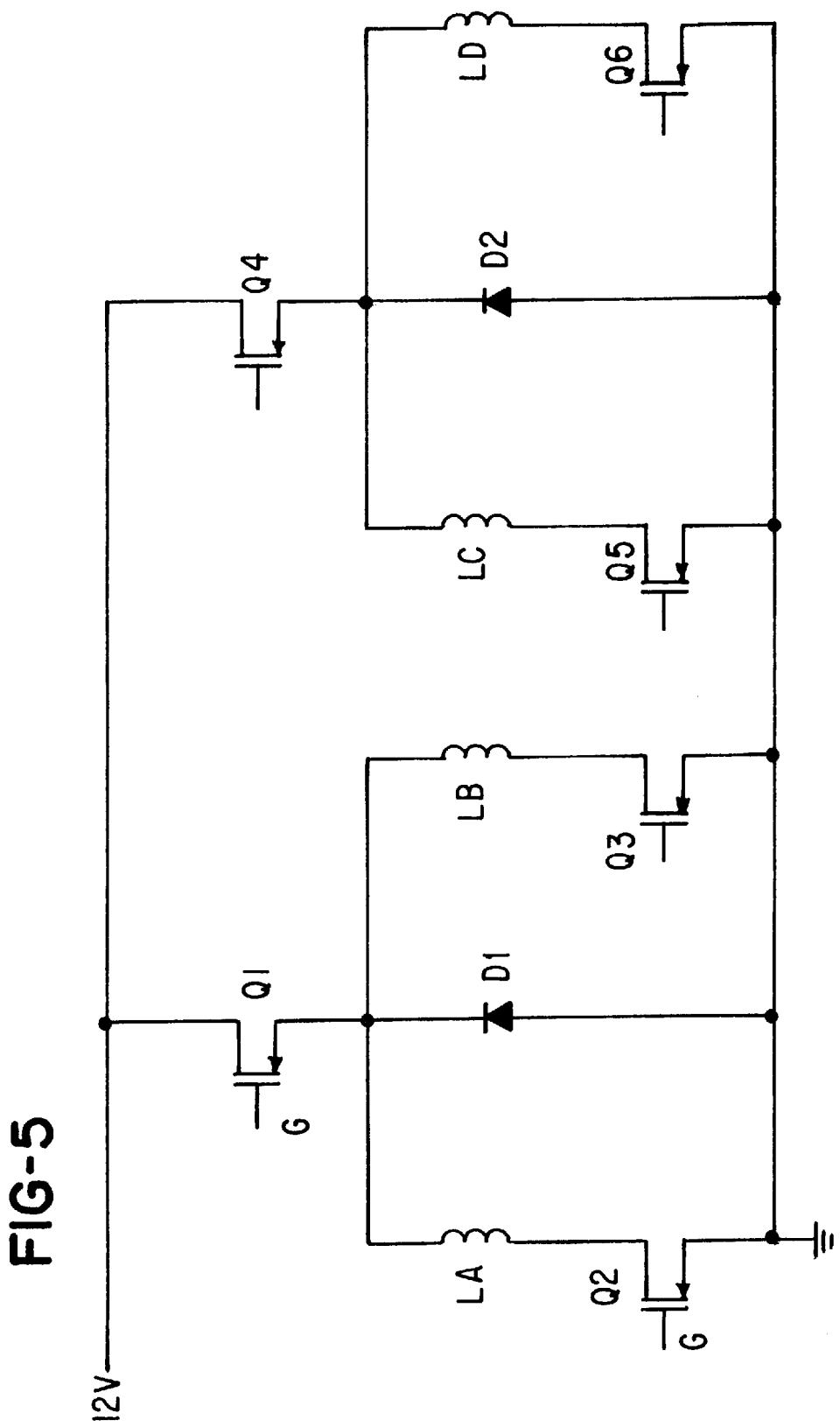
Figure 6:
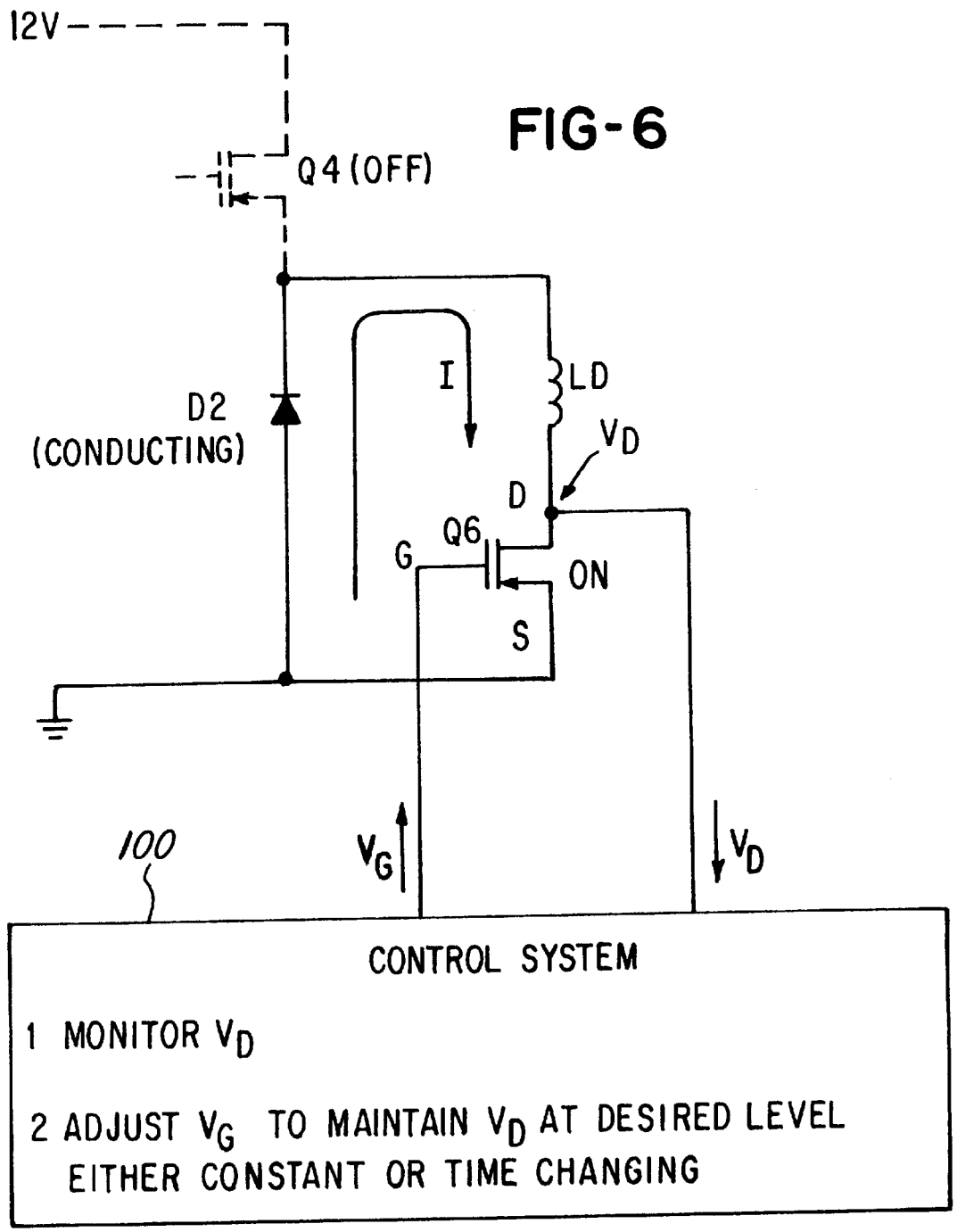
Figure 7:
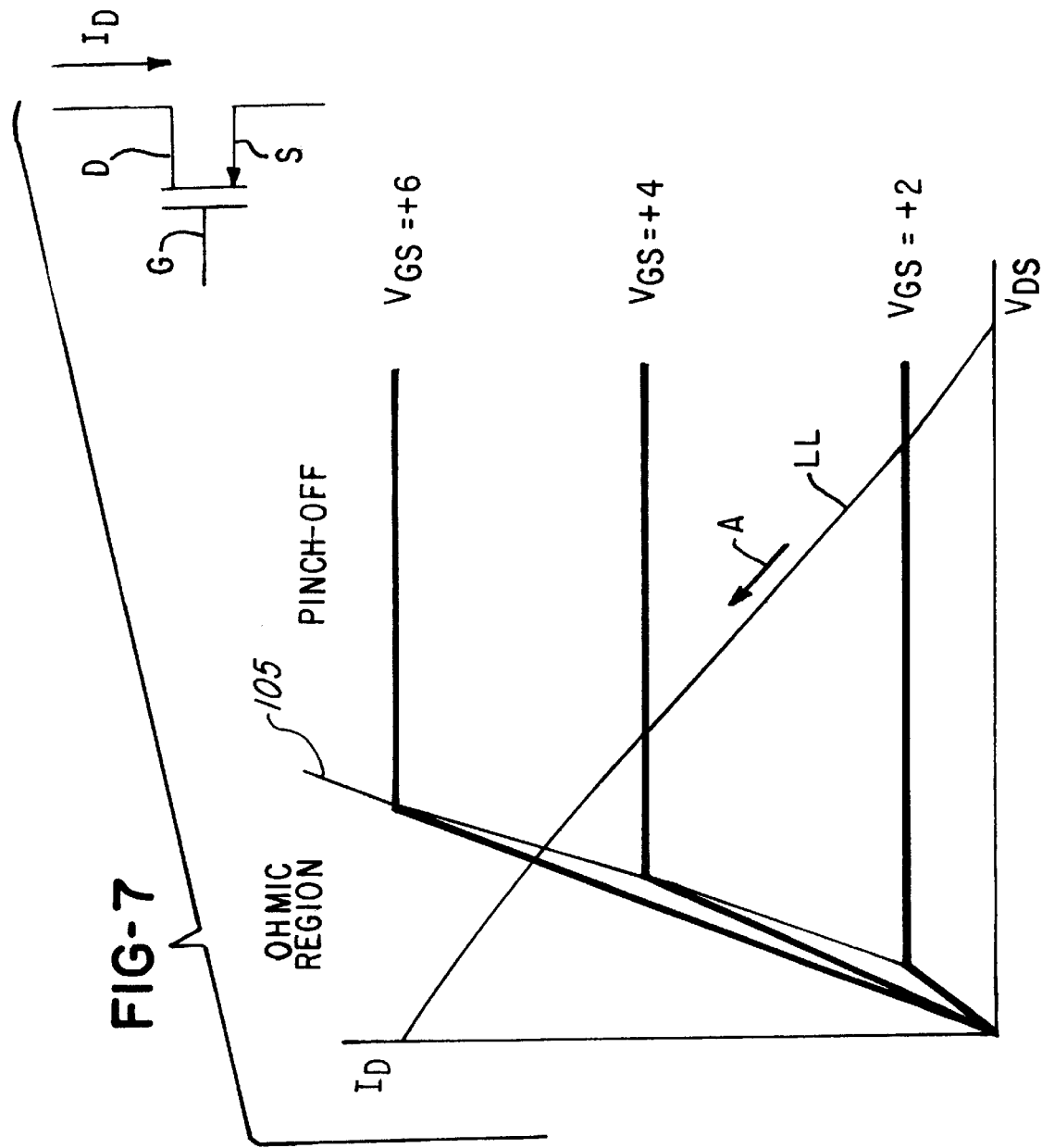
Figure 8:
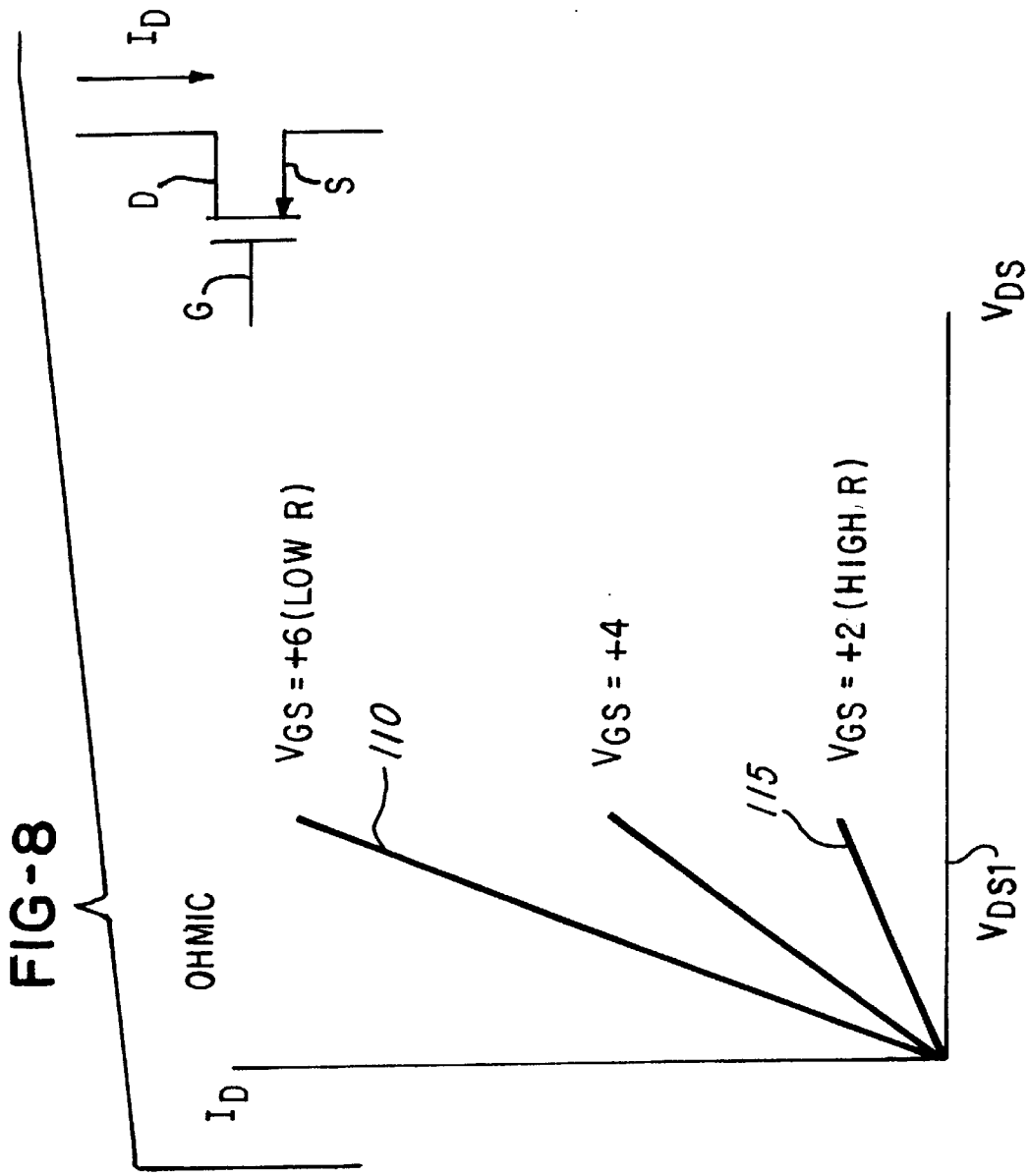
Figure 9:
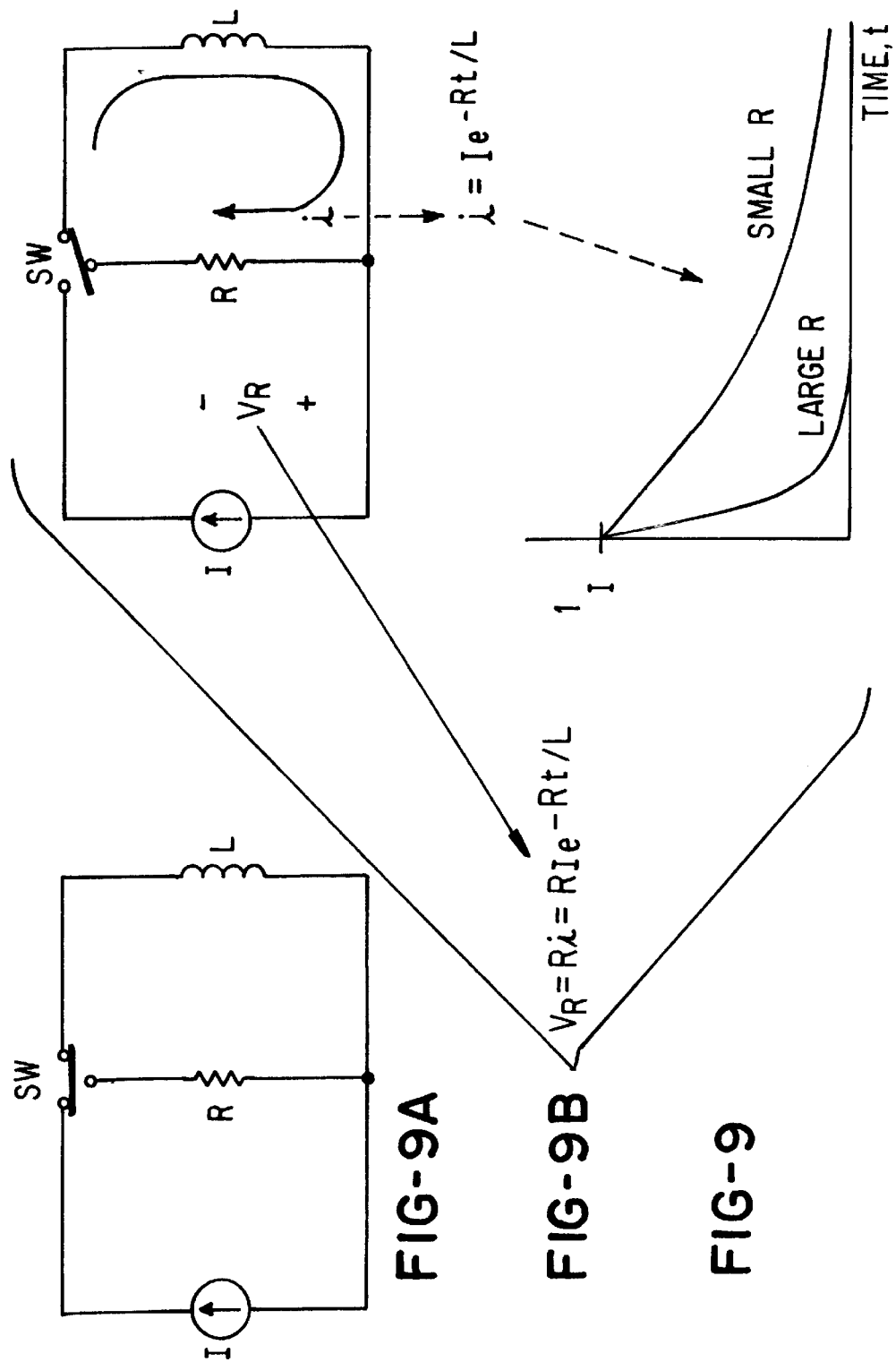
Figure 10:
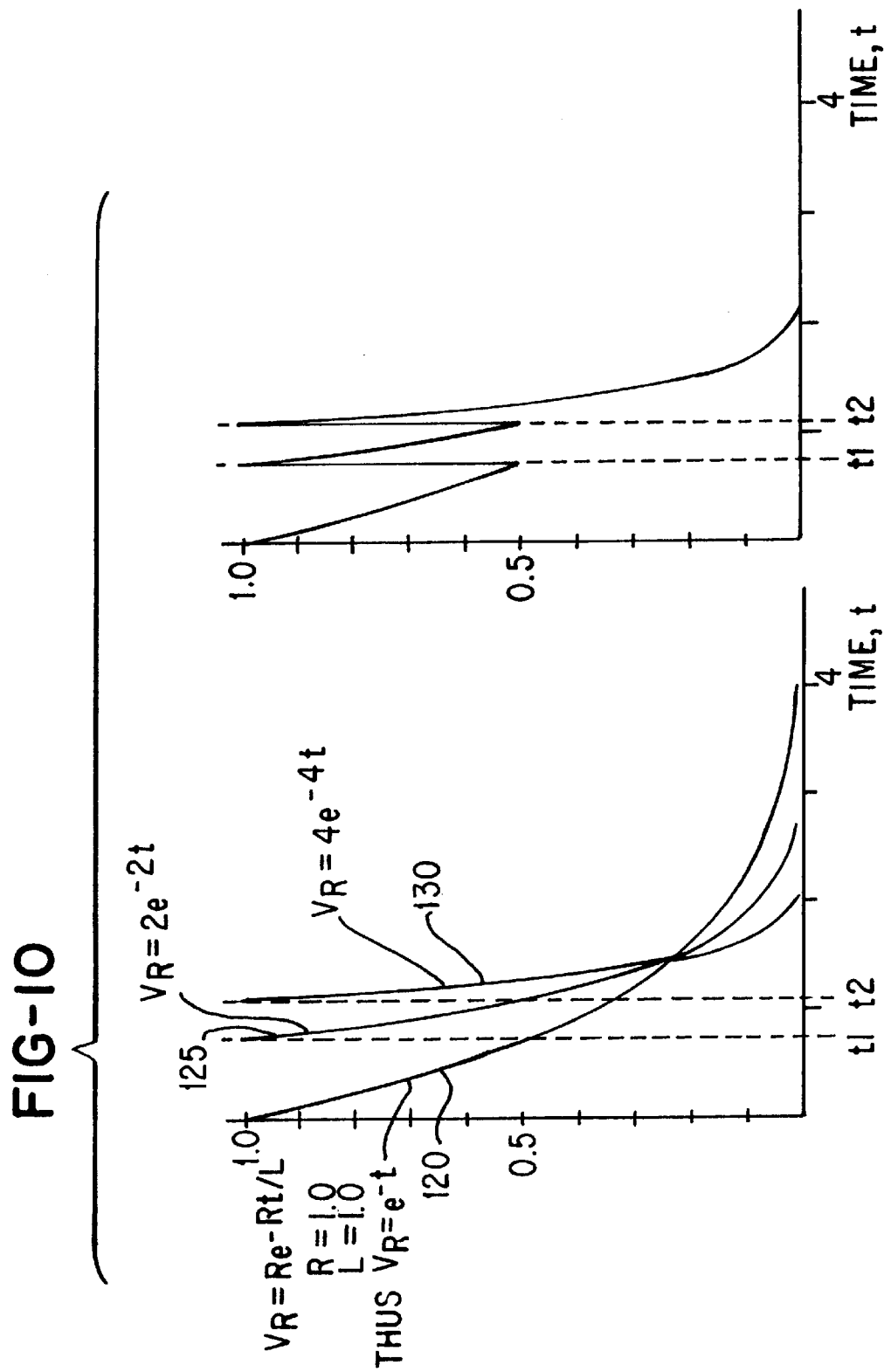
Figure 11:
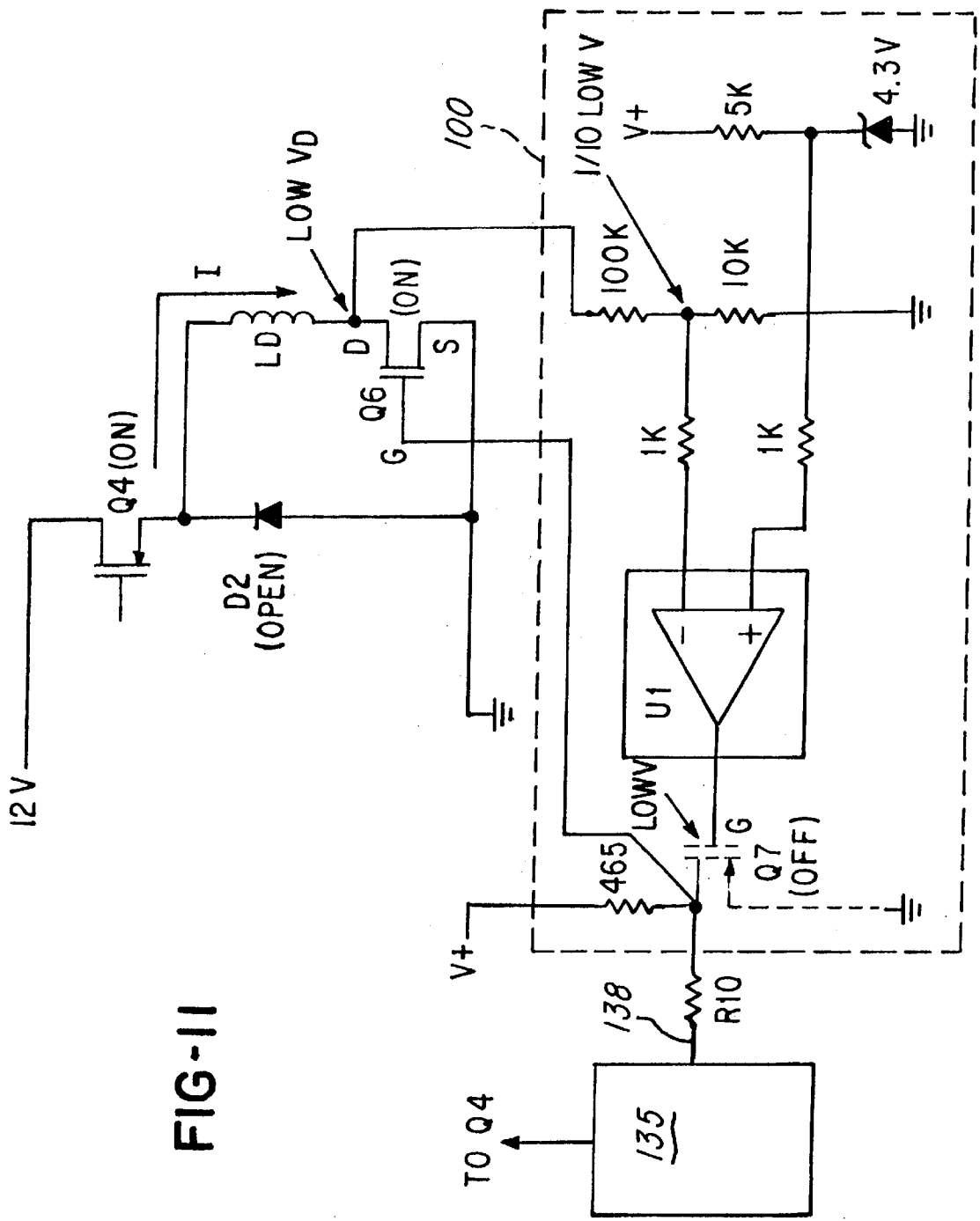
Figure 12:
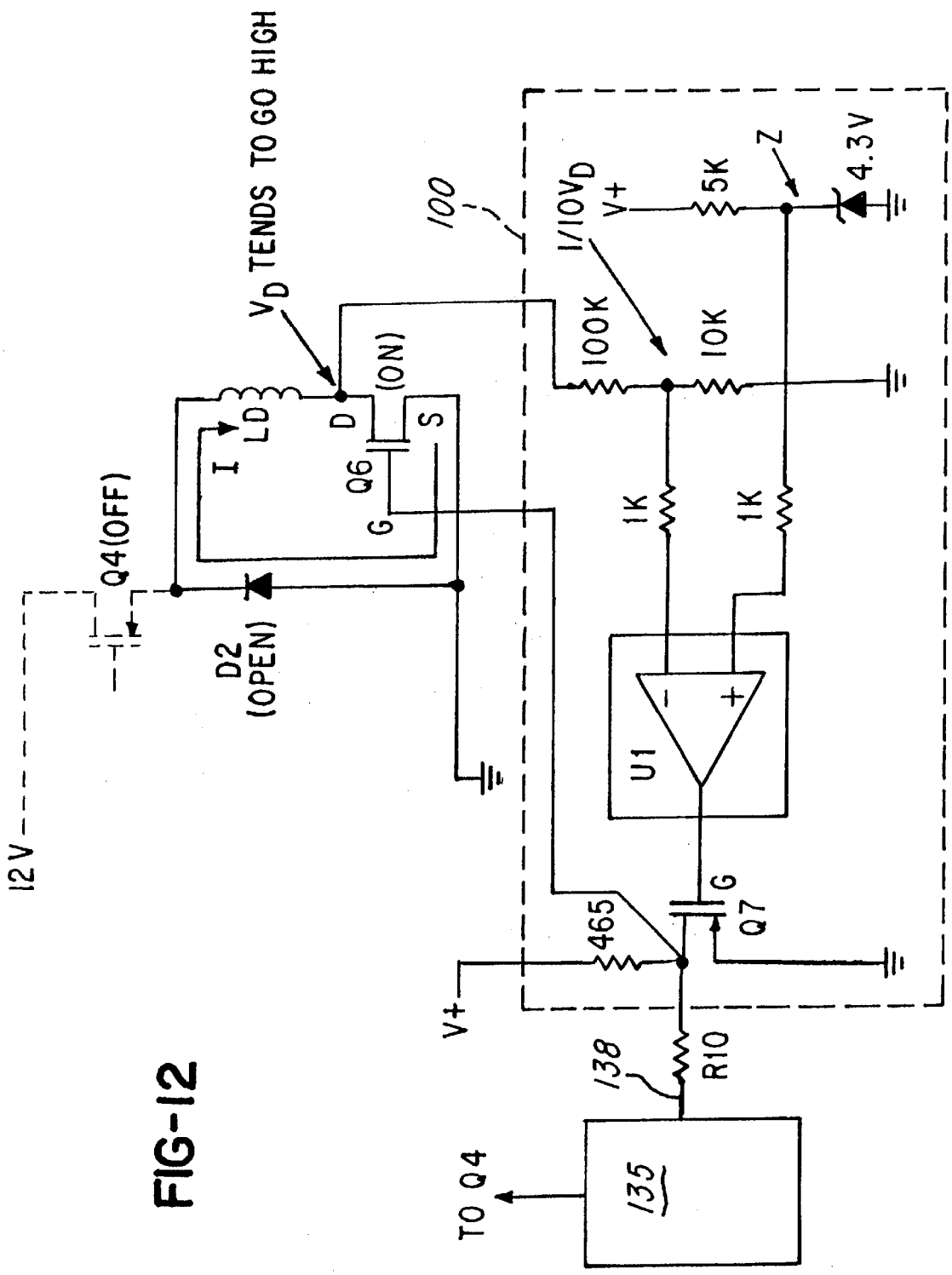
Figure 13:
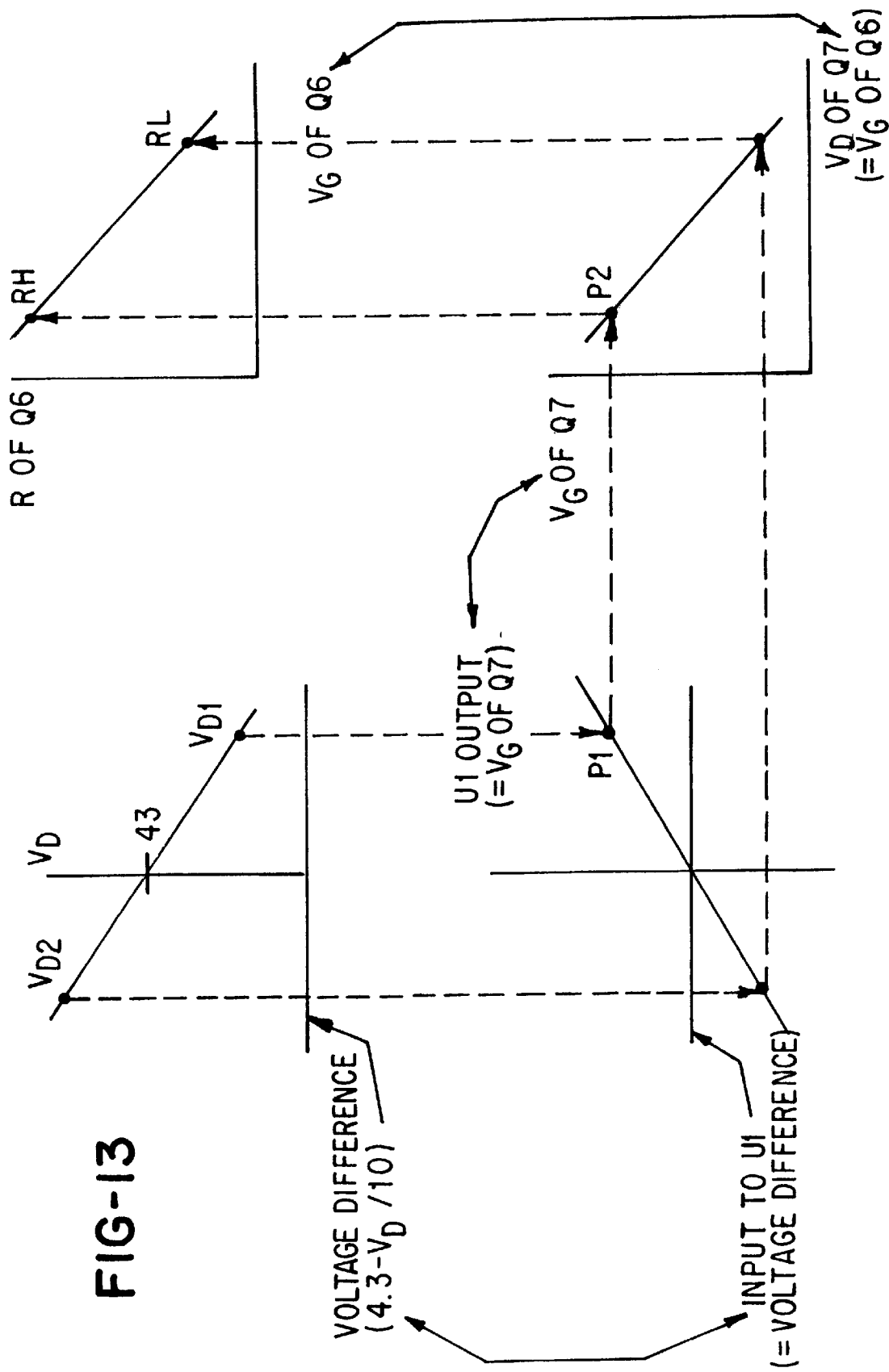
Figure 14:
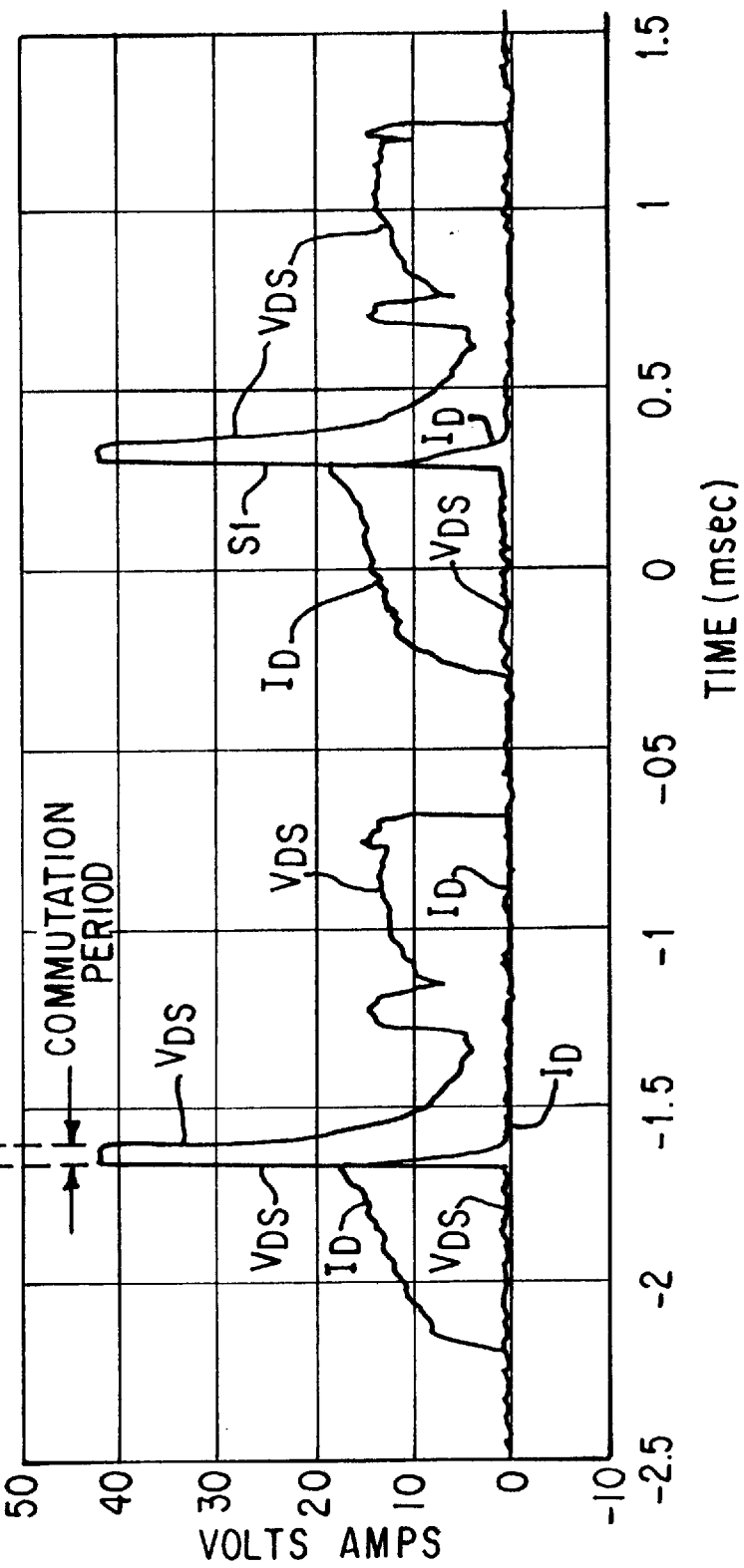
Figure 15:
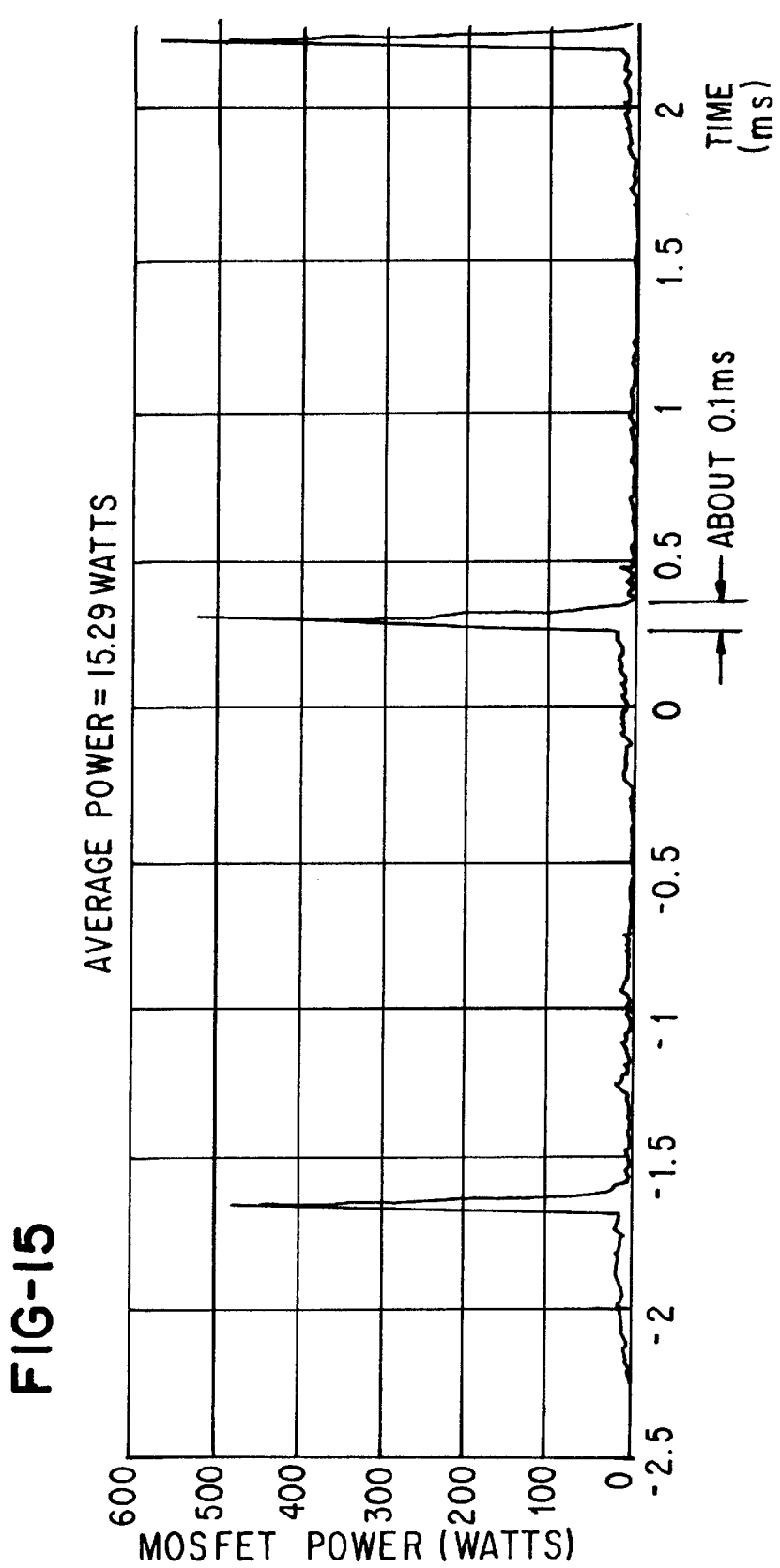
Figure 16:
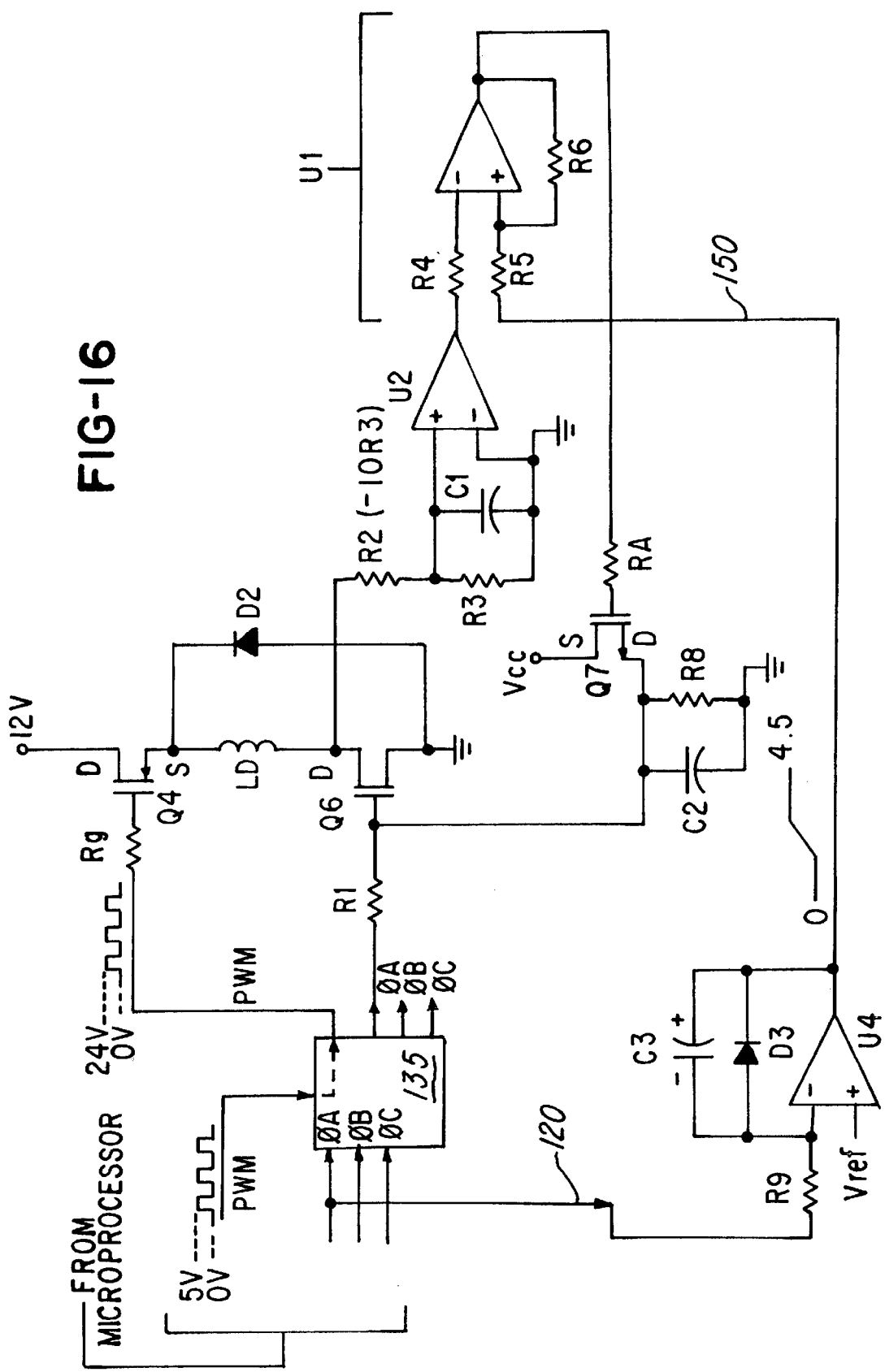
Figure 18:
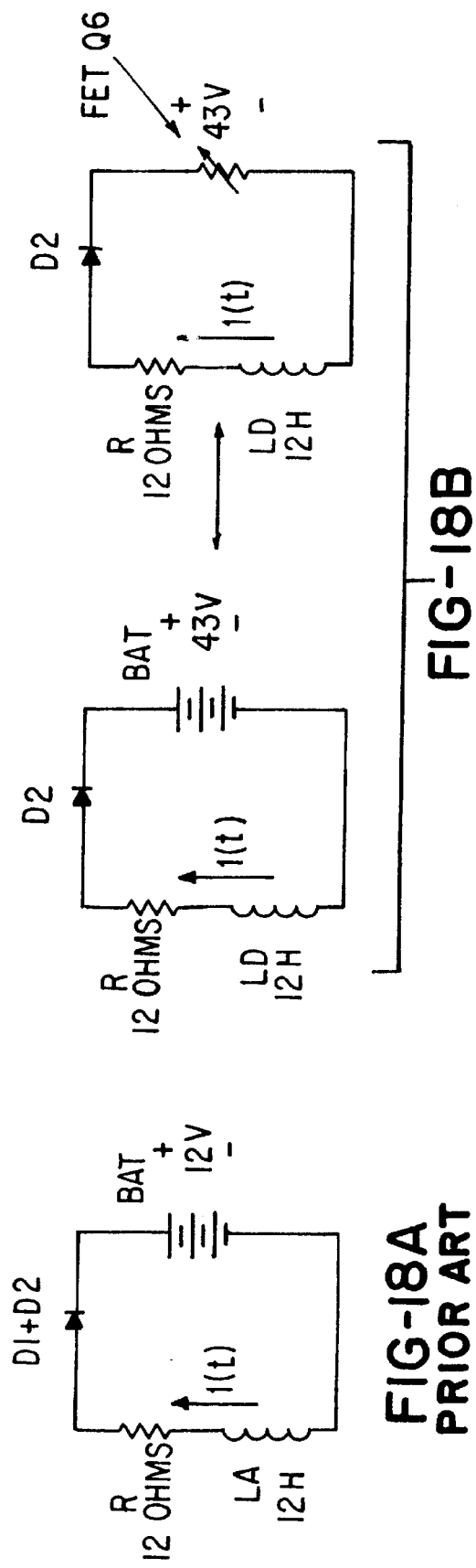
Figure 19:
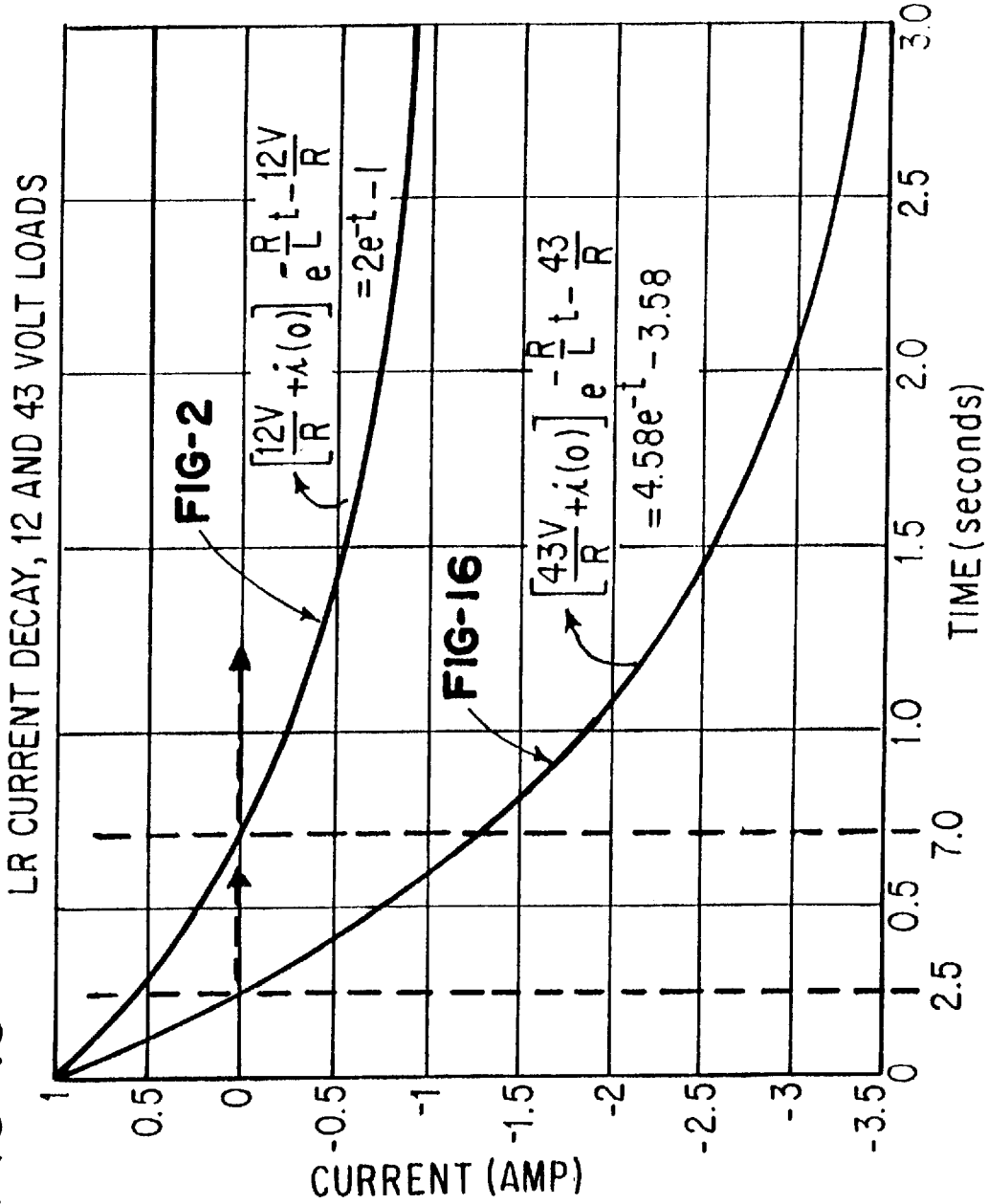

FIGS. 3A, 3B, and 4 illustrate various stages of the commutation cycle;

FIG. 5 illustrates one form of the invention;

FIG. 6 illustrates a control system 100 utilized by one form of the invention;

FIGS. 7 and 8 illustrate idealized operating characteristics of a n-channel enhancement-mode field-effect transistor;

FIGS. 9A and 9B illustrate the time-decay of current in an RL circuit;

FIG. 10 illustrates modification of the time-decay of the voltage across the resistor of FIG. 9, through changes in the resistor's value;

FIGS. 11 and 12 illustrate one form of the control system 100 shown in FIG. 6;

FIG. 13 is a simplified view of the interaction of several components of FIGS. 11 and 12;

FIG. 14 illustrates a plot of VDS and ID of transistor Q6 of FIGS. 11 and 12;

FIG. 15 illustrates a plot of power consumption of Q6 in FIGS. 11 and 12;

FIG. 16 illustrates one form of the invention;

FIG. 7 illustrates VDS, ID, and power consumption, for transistor Q6 of FIG. 16;

FIG. 18 illustrate one rationale for the increased commutation speed attained by the apparatus of FIGS. 11 and 12; and FIG. 19 illustrates decay plots for current in inductor $L_A$ of FIG. 2, and $L_D$ of FIG. 16.

DETAILED DESCRIPTION OF THE INVENTION

FIG. 5 illustrates a commutation system used in one form of the invention. Coils $L_A$ through $L_D$ represent motor coils, as illustrated in FIGS. 1–4. Transistors Q1–Q6 in FIG. 5 control current passing through the coils. The transistors Q1–Q6 are controlled by a gating system (not shown), such as the Harris integrated circuit identified above.

FIG. 6 illustrates part of FIG. 5, as it operates during discharge of the coil $L_D$, and a control system 100, which controls transistor Q6. In practice, a copy of control system 100 is provided for each of the coils $L_A$–$L_D$ of FIG. 5, but not all control systems are shown in FIG. 6, for simplicity.

The control system 100 measures $V_D$, as indicated. $V_D$ is the drain voltage of FET Q6. In response, the control system 100 adjusts $V_G$, in order to maintain $V_D$ at a desired level, as also indicated. In general, the desired level can be fixed, or can change with time.

Control systems which monitor a controlled variable, such as $V_D$, and maintain the controlled variable at a target value, by manipulating $V_G$, are known in the art. Before explaining detailed embodiments of the control system 100, a brief background regarding operation of several of the components shown in FIG. 6 will first be given.

FET as Voltage-Controlled Resistance

Field-Effect Transistor (FET) Q6 can operate as voltage-controlled variable resistor. FIG. 7 provides a simplified plot of the operating characteristics of a generalized n-channel enhancement mode FET, which is shown at the upper right part of the Figure. FIG. 7 plots drain current, $I_D$, against drain voltage, $V_{DS}$, for different gate voltages, $V_{GS}$.

The operation can be divided into two regions, "ohmic," which lies to the left of parabolic line 105, and "pinch-off," which lies to the right. FIG. 8 illustrates the ohmic region, in further simplified form. FIG. 8 indicates that, for a given drain voltage, such as $V_{DS1}$, the drain current depends on gate voltage, $V_{GS}$. Specifically, for example, drain current is larger for a $V_{GS}$ of +6 volts than for a $V_{GS}$ of +2 volts.

The resistance of the FET, by definition, is the ratio of voltage across the FET, namely, $V_{DS}$, to current passed by the FET, namely, $I_D$. (More precisely, the resistance is the first derivative, $d(V_{DS})/d(I_D)$.) This ratio is the inverse of the slopes of the lines shown in FIG. 8. Thus, line 110, having high slope, represents a low resistance, as indicated, and line 115, having a low slope, represents a high resistance, again as indicated.

Therefore, FET Q6 in FIG. 6, and its counterparts in FIG. 5, are capable of operating as voltage-controlled resistors.

Discharge Characteristics of RL Circuit

FIG. 9 illustrates the discharge characteristics of an RL circuit. In FIG. 9A, a constant current I is driven through an inductor L. At some time, the switch SW switches to the position shown in FIG. 9B. The current now decays exponentially through the resistor R, according to the expression shown, which is $$i = I e^{-Rt/L}.$$

The plot at the bottom of the Figure indicates the time-behavior of the current for two values of R, namely, a small value and a large value. Clearly, the small R causes a slower decay than the large R. It will be seen later that the resistor R corresponds to FET Q6 in FIG. 6, when operated as a voltage-controlled resistance, described above.

FIG. 9B, lower left, also indicates the time-behavior of the voltage $V_R$ across the resistor R. By Ohm's law, this voltage is Ri, where i is given by the exponential expression in FIG. 9B. Clearly, (1) this voltage $V_R$ depends on R itself, because i is multiplied by R, and (2) the rate of decay of the voltage depends on R, because R appears in the exponential term.

Control of Voltage in RL Circuit by Controlling R

FIG. 10 illustrates a possible approach to controlling the voltage $V_R$ across the resistor R in FIG. 9. Assume for simplicity, as indicated at the upper left side of FIG. 10, that R and L both are assigned values of unity. Then the voltage $V_R$ is given by the expression $V=e^{-t}$, as indicated. Plot 120 indicates this voltage.

Now assume that, at time t1, when the voltage equals 0.5, the value of the resistor R is doubled. Now the voltage across the resistor is given by a new expression: $V=2e^{-2t}$. (For simplicity, the correction for the time-shift in the exponential term is not stated. The exponential term would actually be $-2[t-t_1]$).

The doubling of R changes two features. One is that the voltage $V_R$ across the resistor immediately doubles, because the resistor value has doubled, but the current through the resistor has not changed, at the instant when the resistance changes (although the current continues to decrease exponentially).

The second feature is that the time constant for the decay of the current has now doubled. That is, the exponential decay is according to negative 2t, rather than according to negative t, as previously. Thus, while the instantaneous voltage across the resistor has doubled, the rate of decay of the voltage is now more rapid. The voltage now follows plot 125 in FIG. 10.

Assume at time t2, when the voltage again equals 0.5, that the value of the resistor again doubles. Again, the instantaneous voltage doubles, and the time constant also doubles. The voltage again begins decaying, along plot 130, from 1.0, but at a much more rapid rate.

The plot at the right side of FIG. 10 indicates the actual time-behavior of the resistor voltage, with the non-relevant parts of plots 120, 125, and 130 removed. Thus, controlling R in FIG. 9B will control the voltage across the R, as well as the rate of decay of that voltage.

Therefore, the preceding discussion indicates that (1) an FET can act as a voltage-controlled resistance and (2) in a discharging RL circuit, the value of R determines the voltage across the resistor, as well as the rate of change of that voltage.

One Form of Invention

FIGS. 11 and 12 illustrate one possible embodiment of the control circuit 100 of FIG. 6. A more complex embodiment, shown in FIG. 16, is preferred, but FIG. 11 is considered at present because its operation is simpler to explain, and it illustrates several important features of FIG. 16.

A gate-drive circuit 135 in FIG. 11, such as the Harris Semiconductor model D469A mentioned above, controls transistor Q4 and Q6. Transistor Q6 is preferably of the type SUP 75NO6-08. The drain voltage of Q6 is divided by ten, by the pair of resistors 100K and 10K, and applied to the (−) input of op-amp U1. The (+) input of U1 receives a constant 4.3 volts from Zener diode Z. U1 is preferably of type LMC6492, and configured in the non-inverting mode. Thus, the output of U1 is given by the expression $[4.3-(V_D/10)]$ [GAIN OF U1]. The controller 100 monitors the voltage VD, and produces an operation which may be summarized as follows.

Conduction Through $L_D$

In FIG. 11, the controller 135 turns ON transistor Q4. (Preferably, the controller 135 operates Q4 in a pulse-width modulated mode, but this mode will not be discussed herein.) When gate controller 135 pulls line 138 HIGH, transistor Q6 goes ON, pulling its $V_D$ low, to the range of a few tenths of a volt. This $V_D$ drives the output of U1 to a low voltage, pulling the gate G of Q7 low, thereby driving transistor Q7 into a high-resistance state, or turning Q7 OFF. Q7, being OFF, does not interfere with control of Q6 by gate controller 135. Controller 135 applies current to inductance $L_D$ at the rotor position shown in FIG. 3A, by controlling transistors Q4 and Q6 in FIG. 11.

Modulation of $V_D$ During Commutation

When the rotor reaches the position shown in FIG. 4, termination of the current begins. In FIG. 12, the controller 135 pulls its output 138 LOW, attempting to turn OFF Q6. The control 100 monitors $V_D$ of Q6 and modulates the voltage of gate G of Q6, in order to maintain $V_D$ at 43 volts, which is ten times the Zener voltage of 4.3 volts. This operation will be explained in greater detail by reference to FIG. 13. In brief, when $V_D$ of Q6 in FIG. 12 goes high, the controller 100 raises $V_G$ of Q6, in order to reduce the resistance of $Q_6$, to thereby pull $V_D$ low.

In greater detail, the upper left part of FIG. 13 plots the voltage difference which is applied to amplifier U1 in FIG. 12, against $V_D$ of Q6. That difference is $4.3-V_D/10$. For example, when $V_D$ equals 43 volts, the difference is zero, as indicated; when $V_D$ is less than 43, the DIFFERENCE is positive; and when $V_D$ is greater than 43, the DIFFERENCE is negative, all consistent with the negatively sloping line shown in the plot.

The lower left part of the Figure plots the output of U1 against its input. The input is the voltage DIFFERENCE of the preceding plot. When the DIFFERENCE is negative, the output of U1 is negative, and when the DIFFERENCE is positive, the output of U1 is positive, consistent with the positively sloping line shown in the plot.

The lower right part of FIG. 13 plots $V_D$ of Q7 against its $V_G$. This plot can be justified by recognizing that $V_D$ of Q7 follows the load line LL shown approximately in FIG. 7. (The numerical values of FIG. 7 are arbitrary, and are used to illustrate trends, rather than exact values.) As the gate voltage moves in the positive direction, the drain voltage VDS drops, as the operating point moves in the direction of arrow A. Thus, increasing the gate voltage of Q7 causes its drain voltage to drop, consistent with the plot at the lower right part of FIG. 13.

The upper right part plots resistance of Q6 against $V_G$ of Q6, which equals $V_D$ of the preceding plot.

When Q6 in FIG. 12 turns OFF, assume that its drain voltage is at $V_{D1}$, as shown at the upper left part of FIG. 13. The dashed arrows indicate that the control system induces a high resistance in Q6, indicated as $R_H$. That is, this voltage difference causes amplifier U1 to operate at point P1, which causes Q7 to operate at P2, thereby causing Q6 to present the resistance $R_H$.

This sequence can be understood qualitatively by recognizing that, at this time, a low $V_D$ in Q6 is not desired, but, rather, a high $V_D$ is desired. A high R in Q6 will produce the high $V_D$, in the manner explained above, in connection with FIG. 9.

If $V_D$ of Q6 rises above 43 volts, to point $VD_2$ at the upper left of FIG. 13, the dashed arrows indicate that the control system induces a low resistance in Q6, indicated as $R_L$. A low resistance will lower $V_D$ in Q6.

If $V_D$ of Q6 should move to a value other than $V_{D1}$ or $VD_2$, then the resulting value of the resistance of Q6 is found by using arrows similar to the dashed arrows shown.

It should be understood that the plots of FIG. 13 illustrate general principles only. The actual feedback control circuit of FIGS. 11 and 12 is somewhat complex in its operation, primarily because some of the controlled variables (such as the resistance of Q6 and the drain voltage of Q7) are non-linear, with respect to their controlling signals. Thus, the straight lines plotted in FIG. 13 are simplifications. The exact control-system equations can be written, if desired, based on the component values, and identities of components, shown in FIGS. 11 and 12. One of the general trends is that, as $V_D$ of Q6 increases when Q6 commutates, that $V_D$ is caused to rise, through an increase of the resistance of Q6, but then clamped at 43 volts.

FIG. 14 is a time-plot of $I_D$ and $V_{DS}$ of Q6. Within the "COMMUTATION PERIOD," the near-exponential decay of $I_D$ is apparent, together with the spike of $V_{DS}$, which is clamped at about 43 volts, corresponding to the Zener voltage of 4.3 volts of FIG. 12, multiplied by ten. $V_{DS}$ maintains this value for about 0.1 millisecond. Thus, the commutation time, which is the time required to terminate the current through $L_D$ in FIG. 12, has been reduced to about 0.1 millisecond, which equals 100 micro-seconds. This is a significant reduction, compared with the prior-art turn-off time of 400 micro-seconds, discussed in the Background of the Invention.

As explained above, a motor running at 3600 rpm requires 16,667 micro-seconds per revolution. The 100-microsecond turn-off time thus represents 100/16,667×360, or 2.16 degrees. Consequently, the onset of commutation can be delayed until the phase P in FIG. 4 is within 2.16 degrees of the aligned position. Restated, commutation can be initiated when angle A2 equals 2.16 degrees. Clearly, under the invention, commutation can begin later than the 8.2 degrees discussed in the Background of the Invention, and can begin at any position up to the 2.16 degrees just computed. Exemplary angles for the onset of commutation include 2.5, 3.0. 3.5, 4.0, 4.5, 5.0, 5.5, 6.0, 6.5, 7.0, and 7.5 degrees, as well as intermediate angles.

FIG. 15 is a plot of the average power dissipated in Q6 of FIG. 12. The average value of 15.29 watts was obtained by numerical integration techniques. The peak value, of about 525 watts, occurs during the commutation period of about 0.1 millisecond. If this peak is treated as a triangle, it can, for power dissipation purposes, be treated as a constant value of 525/2, for the entire commutation period of 0.1 milliseconds.

Another Form of Invention

FIG. 16 illustrates another embodiment of the invention. Components which are conceptually analogous to those in FIG. 12 are given the same call-outs in FIG. 16. In FIG. 16, amplifier U2 acts as a buffer, to isolate voltage spikes occurring in $V_D$ from amplifier U1.

The operation of FIG. 16 is somewhat similar to that of FIG. 12, with one major exception. In FIG. 12, amplifier U1 received a constant 4.3 volt reference signal. In contrast, in FIG. 16, amplifier U1 receives a time-varying reference signal on line 150, which is generated by integrator U4. The particular signal shown is a ramping signal, which ramps from zero to about 4.5 volts. The ramping signal is initiated by the signal, applied to line 200, and occurs contemporaneously with the turn-off of transistor Q6. The time over which the ramping from zero to 4.5 volts occurs corresponds to the time over which the current in $L_A$ decays.

Amplifier U4 acts as an integrator when line 120, its input, is negative with respect to line 150, its output. However, diode D3 acts as a short circuit when line 150 becomes negative with respect to line 120, causing amplifier U4 to act as a voltage follower.

Figure 17:
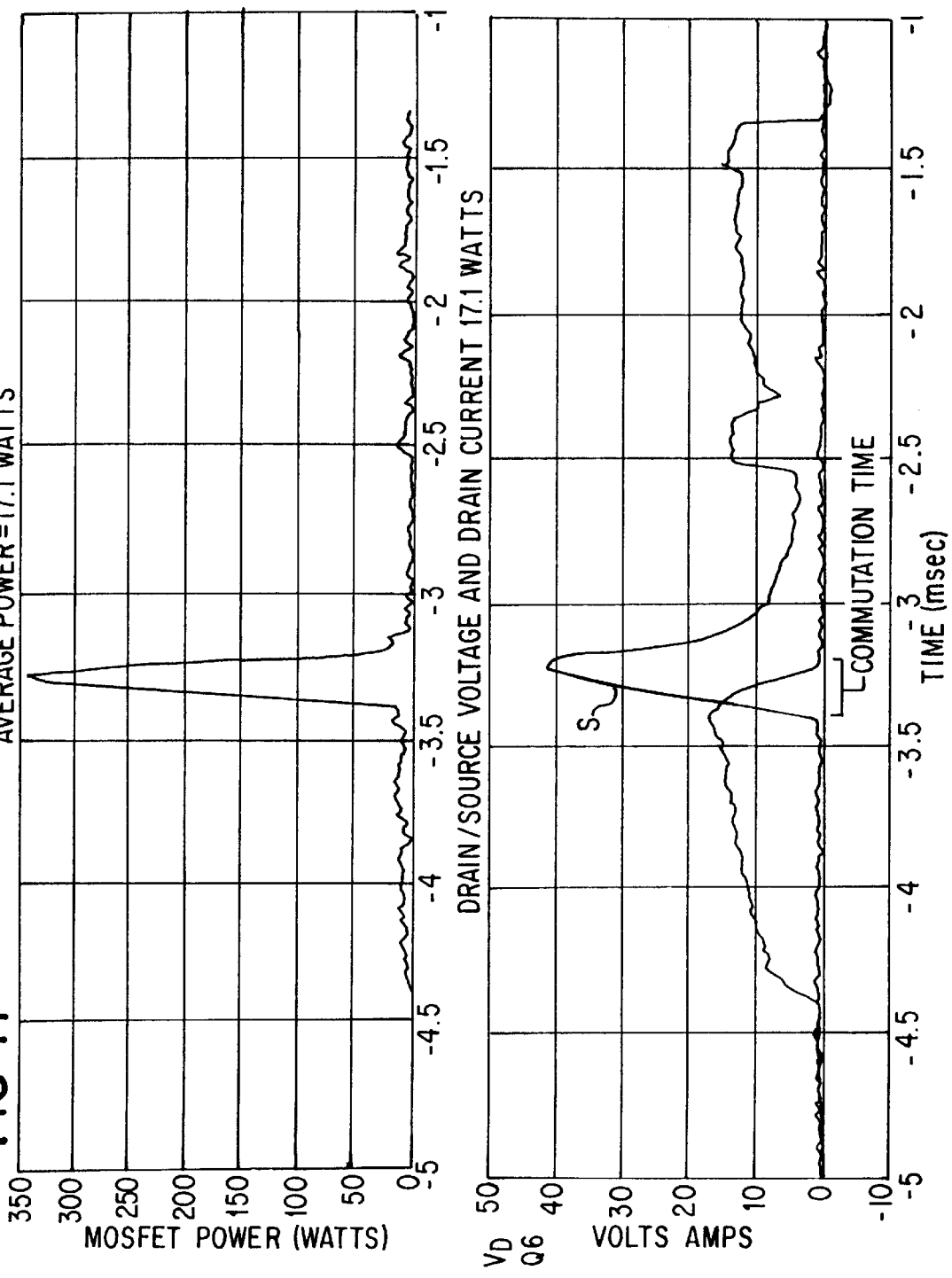

FIG. 17 illustrates the time over which the current in $L_A$ decays, together with other features. The COMMUTATION TIME is about 0.1 or 0.2 milliseconds, and is in the range of that of FIG. 14. Thus, the ramping signal, on line 205, begins when Q6 turns OFF and continues for the COMMUTATION TIME shown in FIG. 17.

FIG. 17 shows that $V_D$ of Q6 is again clamped at about 43 volts. The average power dissipated in Q6 is about 17.1 watts. In comparing FIG. 17 with FIG. 14, it is observed that the slope of line S in FIG. 17 is less steep than the slope of line S1 in FIG. 14. This smaller slope results primarily from the ramping reference signal of FIG. 16.

That is, the control system can be viewed as minimizing an error signal, which is the difference between ten percent of $V_D$ of Q6 and the ramping signal. When the error signal is minimized to zero, then $V_D$ is caused to equal the ramping signal, multiplied by ten.

Since the ramping signal changes over time, the controlled $V_D$ is constrained to follow the ramping signal, multiplied by ten. Thus, the slope of line S in FIG. 17 corresponds generally to the ramping signal, multiplied by ten.

This slope reduced slope reduces audible noise, through reducing the instantaneous release of the hoop stress on the stator 12, which was discussed above in connection with the lines B of FIG. 4.

Additional Considerations

1. The invention increases output power of a given motor, and is preferably applicable to fractional horsepower motors, having a nameplate power consumption rating of less than 1,000 watts. In a test of a four-phase motor, wherein the theoretical conduction angle A of FIG. 3A is 22.5 degrees, 28 oz.-in. of torque were measured in normal switched-reluctance operation. After delaying the onset of commutation, as discussed above, the torque measured was 54 oz.-in. Thus, for a motor of given physical size, cost, and weight, horsepower can be nearly doubled, without increasing size, cost, or weight (with the exception of increases, if any, due to the circuitry of the invention).

It should be emphasized that this increase in horsepower is perhaps best suited to motors which are run on an intermittent basis, such as window-opening motors, or motors for pumps in anti-skid braking systems. One reason is that the increased duration of current conductance through coil $L_D$ in FIG. 5 will cause an increase in heat production.

The motor may not be able to dissipate the heat, if produced on a sustained basis.

Another factor to consider is that the increased horsepower will increase mechanical loads on the motor.

One definition of "intermittent basis" is that, during the operation of the overall system in which the motor is installed, such as an automobile, the motor itself operates for less than 20 percent of that overall system operation. Another definition is that the motor is not operated for more than 12 seconds and, after such operation, the motor remains inoperative for at least 48 seconds.

2. One factor which is involved in the reduced commutation time shown in FIG. 14 is explained with reference to FIG. 18. FIG. 18A is a representation of one phase of FIG. 2, during decay of the current through the inductor L. The resistor R represents resistance of the circuit elements, even though no resistor is shown in FIG. 2. To simplify the computation, the resistor is given an assumed value of 12 ohms, and the inductor given an assumed value of 12 henries. The 12-volt battery BAT represents the vehicle's storage battery.

The current decays exponentially, according to the expression $$i(t)=(V/R+i_0)e^{-Rt/L}-V/R.$$

The term $i_0$ is the current immediately preceding the opening of the FETs in FIG. 2. With a resistor R of 12 ohms, shown in FIG. 18A, this current will be 1 amp.

For the invention of FIG. 16, the decaying circuit is basically the same, and is shown in FIG. 18B, left side. However, now the battery BAT represents the variable-resistance of FET Q6 of FIG. 16, as indicated by the right side of FIG. 18A, instead of the vehicle's storage battery. This "battery" is clamped at 43 volts, as explained above. The form of the decay equation is the same as that given above, but the value of "V" is different.

FIG. 19 illustrates the decay-plots for the two situations. Clearly, the current of FIG. 2 requires about 7.0 seconds to decay to decay to zero, while the current of FIG. 16 requires about 2.5 seconds, or about 35 percent of 7.0 seconds. (Of course, the values of 2.5 and 7 seconds result from the assumed values for the components of the circuits in FIG. 18. The actual values to reach zero current will be much smaller.)

3. The term "ohmic region" or "ohmic regime" is well known, and is also called the "linear region" or "triode region." One description is given in *Microelectronic Circuits,* by Sedra and Smith, chapter 7.2 (ISBN 0 03 007328 6, Holt, Rinehart & Winston, 1987).

4. A nominal value for the inductance of the coil $L_D$ at the onset of commutation is 600–800 microHenries. It should be observed that, not only does the invention clamp the drain voltage of Q6 in FIG. 12 during discharge of the coil $L_D$, but it also clamps the voltage across the coil itself, because the coil is connected in series between Q6 and ground.

5. The commutation circuit 14 of FIG. 2 can be called the "free discharge" type, because the coils L discharge according to the well-known L/R time constant, and that time constant is not actively controlled. In contrast, the invention controls the time constant. As one example, the resistance of Q6 in FIG. 12 is progressively increased after Q6 turns OFF, until the drain voltage $V_D$ reaches 43 volts.

Numerous substitutions and modifications can be undertaken without departing from the true spirit and scope of the invention. What is desired to be secured by Letters Patent is the invention as defined in the following claims.

What is claimed is:

1. In a controller for a switched reluctance motor, the improvement comprising:
  a) a power FET which controls current through a coil of the motor; and
  b) a system for causing the power FET to operate in its ohmic region during discharge of current through the coil.

2. Controller according to claim 1, in which
  i) the power FET carries discharge current of the coil, and
  ii) the system modulates resistance of the power FET during discharge of the coil.

3. Controller according to claim 1, in which the power FET carries discharge current of the coil, and the system limits voltage across the power FET during discharge.

4. A controller for a switched reluctance motor having a coil, comprising:
  a) a transistor for controlling current through the coil; and
  b) a system for
    ii) causing the transistor to carry both charging current, and discharging current, for the coil and
    iii) increasing resistance of the transistor during discharge, for reducing time required for discharge.

5. A motor system, comprising:
  a) a fractional horsepower motor, which includes at least one coil; and
  b) a control system effective to terminate current in the coil in less than 200 microseconds.

6. A motor system, comprising:
  a) a fractional horsepower motor, which includes a pole which rotates past a stator coil; and
  b) a control system which begins terminating current in the stator coil when the pole is closer than 5.0 degrees of alignment with the stator coil.

7. System according to claim 6, wherein the control system fully terminates the current before the pole reaches alignment with the stator coil.

8. A motor system, comprising:
  a) a motor coil, through which an increasing current flows, followed by a decreasing current; and
  b) a circuit system, which
    i) causes the increasing current to flow through an FET; and
    ii) causes the decreasing current to flow through said FET.

9. A motor system, comprising:
  a) a plurality of phase coils in a motor;
  b) a first transistor, a second transistor, and a diode, all associated with a first phase coil, connected such that
    i) in one mode of operation, the first and second transistors deliver current to the first phase coil; and
    ii) in another mode of operation, the first transistor and the diode pass a decaying current carried by the first phase coil.

10. A motor system, comprising:
  a) a motor, which includes an even number of phases; and
  b) a commutation circuit which
    i) contains, for each pair of phases, no more than three power transistors and one power diode, and
    ii) is effective to deliver, and then terminate, current for each phase in sequence.

11. A switched reluctance motor system, having multiple phases, for use in an automotive vehicle, comprising:
   a) a commutation circuit; and
   b) for each phase of the motor, a control system for modulating a resistance contained in a discharge path of the phase, during discharge.

12. A switched reluctance motor system for use in an automotive vehicle, comprising:
   a) a discharge path, having a time constant, for at least one phase of the motor; and
   b) a control system for adjusting the time constant during discharge.

13. For a switched reluctance motor, which produces a given amount of power when commutated by a free-discharge commutation circuit, the improvement comprising:
   a) a commutation means, for replacing the free-discharge commutation circuit, effective to increase the power produced, by delaying onset of commutation.

14. A motor system, comprising:
   a) at least one phase within the motor, comprising at least one coil (LD) having an inductance;
   b) a first field-effect transistor (Q6), in series with said coil (LD), having a drain (D), source (S), and gate (G), for controlling current through said coil (LD);
   c) a diode (D2), in parallel with the series combination of the first field-effect transistor (Q6) and the coil (LD);
   d) a second field-effect transistor (Q4), for supplying current to the coil (LD), and to another coil (LC);
   e) a control system for monitoring voltage of said drain (D) during discharge of said coil (LD) and, in response, adjusting voltage applied to the gate (G).

15. A commutation circuit for a motor having phases, consisting essentially of:
   a) a first transistor, for each phase, which controls current through the respective phase;
   b) a diode, connected to multiple phases, which
      i) is back-biased when current initiates in any phase; and
      ii) becomes forward-biased when current decays in any phase;
   c) a second transistor, which supplies current to more than one phase.

16. A motor system, comprising:
   a) a motor having coils;
   b) a power FET connected in series with one coil, with the drain of the power FET connected to the coil, such that the power FET is effective to control current through the coil;
   c) a diode connected in parallel with the series connection comprising the power FET and the coil, and poled so that, when the coil discharges its current, the diode is conducting;
   d) a voltage divider for producing a fractional signal which is a fraction of the voltage at the drain of the power FET;
   e) a waveform generator for producing a ramp signal;
   f) an amplifier for producing an output signal based on the difference between the ramp signal and the fractional signal;
   g) a signal FET for receiving the output signal, and generating a control signal which is applied to the gate of the power FET; and
   h) a gate-controller circuit, for
      i) turning the power FET ON and OFF, and
      ii) when the power FET is turned OFF, triggering the waveform generator into producing the ramp signal, wherein the control signal causes the power FET to operate in its ohmic regime during discharge of current through the coil, and does not affect operation of the power FET at other times.

17. System according to claim 5, wherein the control system, comprises:
   a) an PET through which said current passes; and
   b) a control circuit for increasing resistance of said FET during termination of said current.

18. System according to claim 6, wherein the control system comprises:
   a) an FET through which said current passes; and
   b) a control circuit for increasing resistance of said FET during termination of said current.

19. System according to claim 5, wherein the control system comprises:
   a) an FET through which said current passes; and
   b) a control circuit for constraining a terminal of the FET to follow a reference voltage during termination of said current.

20. System according to claim 6, wherein the control system comprises:
   a) an FET through which said current passes; and
   b) a control circuit for constraining a terminal of the FET to follow a reference voltage during termination of said current.

21. System according to claim 8, and further comprising a control circuit for constraining one terminal of the FET to follow a predetermined sequence of voltages while the decreasing current flows.

22. System according to claim 9, and further comprising a control system which constrains a terminal of the first transistor to follow a predetermined sequence of voltages while the decaying current flows.

23. System according to claim 11, wherein an FET produces said resistance.

24. System according to claim 12, wherein the control system adjusts the time constant through the step of modulating resistance of an FET.

25. System according to claim 12, wherein the control system adjusts the time constant through the step of modulating gate voltage of an FET.

26. Improvement according to claim 13, wherein the commutation means reduces time over which commutation occurs, compared with the commutation time occurring in the free-discharge commutation circuit.

27. Improvement according to claim 13, wherein the commutation means includes an FET and a control circuit for modulating resistance of the FET during commutation.

28. A method of operating a switched reluctance motor comprising the following steps:
   a) delivering current to a phase of the motor;
   b) reducing said current; and
   c) while reducing said current, modulating a resistance through which said current passes.

29. A method of operating a switched reluctance motor comprising the following steps:

a) discharging current carried by a coil of the motor through an FET; and b) during discharge, modulating gate voltage of the FET.

30. A method of operating a switched reluctance motor, comprising the following steps:

a) delivering current to a coil of the motor through first and second FETs in series with the coil;

b) turning off the second FET;

c) while the second FET is off, discharging current in the coil through the first transistor and a diode; and d) while the current is discharging, modulating resistance of the first FET.

31. Method according to claim 30, in which the step of modulating resistance includes the step of constraining voltage of one terminal of the first FET to follow a predetermined sequence of voltages.

32. Improvement according to claim 1, wherein an increase in resistance of said FET operating in its ohmic region causes current discharging through said coil to increase.

33. A system according to claim 11, wherein modulation of said resistance includes an increase of resistance, which causes current discharging through said phase to increase.

* * * * *